US011829002B2

(12) United States Patent
Li et al.

(10) Patent No.: US 11,829,002 B2
(45) Date of Patent: Nov. 28, 2023

(54) ZOOMING PROJECTION METHOD AND PROJECTOR

(71) Applicant: IVIEW DISPLAYS (SHENZHEN) COMPANY LTD., Shenzhen (CN)

(72) Inventors: Wenxiang Li, Shenzhen (CN); Mingnei Ding, Shenzhen (CN); Steve Yeung, Hong Kong (CN); Zhiqiang Gao, Hong Kong (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 84 days.

(21) Appl. No.: 17/543,953

(22) Filed: Dec. 7, 2021

(65) Prior Publication Data

US 2022/0091362 A1 Mar. 24, 2022

Related U.S. Application Data

(63) Continuation of application No. PCT/CN2020/125923, filed on Nov. 2, 2020.

(30) Foreign Application Priority Data

Aug. 21, 2020 (CN) .......................... 202010851199.4

(51) Int. Cl.
*G02B 7/10* (2021.01)
*G03B 21/14* (2006.01)
*H04N 9/31* (2006.01)

(52) U.S. Cl.
CPC .............. *G02B 7/10* (2013.01); *G03B 21/142* (2013.01); *H04N 9/317* (2013.01); *G03B 2205/0046* (2013.01)

(58) Field of Classification Search
CPC .... G03B 21/008; G03B 21/28; G03B 21/142; G03B 21/147; G03B 21/208; G03B 21/2053; G03B 21/2066; H04N 9/315; H04N 9/317; H04N 9/3102; H04N 9/3105; H04N 9/3185; H04N 9/3188;
(Continued)

(56) References Cited

U.S. PATENT DOCUMENTS

| | | | |
|---|---|---|---|
| 2011/0007227 A1 | 1/2011 | Yonishi | |
| 2012/0008105 A1* | 1/2012 | Katou | ................. H04N 9/3155 353/121 |

(Continued)

FOREIGN PATENT DOCUMENTS

| | | |
|---|---|---|
| CN | 1881069 A | 12/2006 |
| CN | 102590992 A | 7/2012 |

(Continued)

*Primary Examiner* — Sultan Chowdhury
(74) *Attorney, Agent, or Firm* — IPRO, PLLC; Na Xu

(57) ABSTRACT

Embodiments of the present disclosure relate to a zooming projection method and a projector. The projector includes a focusing device and a lens movable along an optical axis. The method includes: acquiring a projection distance between the projector and a projection position; adjusting the lens to a target position for projection by the focusing device in response to the projection distance being within an optical zooming range; and scaling a projection image and projecting the scaled projection image in response to the projection distance being not within the optical zooming range.

10 Claims, 2 Drawing Sheets

(58) Field of Classification Search
CPC ...... H04N 9/3194; G02B 7/003; G02B 7/004; G02B 7/10; G02B 7/102
See application file for complete search history.

(56) References Cited

U.S. PATENT DOCUMENTS

| | | | | |
|---|---|---|---|---|
| 2016/0044289 A1* | 2/2016 | Matsuno | ................ | H04N 9/317 |
| | | | | 348/745 |
| 2016/0295185 A1* | 10/2016 | Mima | ................... | H04N 9/3185 |
| 2017/0261846 A1* | 9/2017 | Maes | ................... | G03B 21/147 |
| 2020/0389629 A1* | 12/2020 | Tamesue | .......... | H04N 21/42204 |
| 2021/0218941 A1* | 7/2021 | Otsuki | ................. | G03B 21/142 |

FOREIGN PATENT DOCUMENTS

| | | |
|---|---|---|
| CN | 105372916 A | 3/2016 |
| CN | 106612421 A | 5/2017 |
| CN | 110463191 A | 11/2019 |

* cited by examiner

ZOOMING PROJECTION METHOD AND PROJECTOR

CROSS-REFERENCE TO RELATED APPLICATION

This application is based upon and claims priority to Chinese Patent Application No. 202010851199.4, filed before China National Intellectual Property Administration on Aug. 21, 2020 and entitled "ZOOMING PROJECTION METHOD AND PROJECTOR," the entire contents of which are incorporated herein by reference.

TECHNICAL FIELD

Embodiments of the present disclosure relate to the technical field of digital projection and display, and in particular, relate to a zooming projection method and a projector.

BACKGROUND

In recent years, with rapid development of semiconductor and display technologies, the projection technology is quickly advanced, and a variety of projectors are available in the market. At present, projectors mostly use a fixed-focus projection method, that is, a projection ratio of the projector remains constant, and a size of a projection picture increases with the increase of a projection distance. However, in some usage scenarios, such as motion projection, and the like, the fixed-focus projection method fails to meet the requirement of maintaining the size of the projection picture unchanged even within a greater projection range.

SUMMARY

In view of the above technical defect, embodiments of the present disclosure provide a zooming projection method and apparatus, which are capable of still maintaining a size of a projection picture unchanged even within a greater projection range.

In one aspect, the embodiments of the present disclosure provide a zooming projection method, applicable to a projector. The projector includes a focusing device and a lens movable along an optical axis. The method includes:

acquiring a projection distance between the projector and a projection position;

adjusting the lens to a target position for projection by the focusing device in response to the projection distance being within an optical zooming range; and scaling a projection image and projecting the scaled projection image in response to the projection distance being not within the optical zooming range.

In some embodiments, adjusting the lens to the target position by the focusing device includes:

acquiring a projection ratio based on the projection distance;

determining the target position based on the projection ratio; and moving the lens to the target position by the focusing device.

In some embodiments, acquiring the projection ratio based on the projection distance includes:

acquiring the projection ratio by using the following formula:

$$TR_t = \frac{D_t}{W}$$

wherein $D_t$ represents the projection distance, $W$ represents a width of a projection picture, and $TR_t$ represents a projection ratio corresponding to the projection distance $D_t$.

In some embodiments, scaling the projection image includes:

acquiring a scale ratio of the projection image and acquiring a scale size of the projection image based on the scale ratio and an original size of the projection image; and scaling the projection image to the scale size.

In some embodiments, an upper limit of the optical zooming range is a maximum adjustable projection distance, wherein the maximum adjustable projection distance corresponds to a maximum adjustable focal length of the lens; and acquiring the scale ratio of the projection image and acquiring the scale size of the projection image based on the scale ratio and the original size of the projection image include:

moving the lens to the target position corresponding to the maximum adjustable focal length by the focusing device;

acquiring the scale ratio of the projection image by using the following formula:

$$\frac{D_1}{D_t}$$

wherein $D_1$ represents the maximum adjustable projection distance, and $D_t$ represents the projection distance; and acquiring the scale size of the projection image by using the following formula:

$$Width_{new} = Width * \frac{D_1}{D_t}$$

$$Height_{new} = Height * \frac{D_1}{D_t}$$

wherein Width represents an original width of the projection image, $Width_{new}$ represents a scale width of the projection image, Height represents an original height of the projection image, and $Height_{new}$ represents a scale height of the projection image.

In some embodiments, a focal length of the lens is in correspondence with the projection distance within the optical zooming range, and acquiring the scale ratio of the projection image and acquiring the scale size of the projection image based on the scale ratio and the original size of the projection image include:

acquiring the scale ratio of the projection image by using the following formula:

$$\frac{D_2}{D_t}$$

wherein $D_2$ represents a projection distance corresponding to a current focal length of the lens within the optical zooming range, and $D_t$ represents the projection distance; and acquiring the scale size of the projection image by using the following formula:

$$Width_{new} = Width * \frac{D_2}{D_t}$$

$$Height_{new} = Height * \frac{D_2}{D_t}$$

wherein Width represents an original width of the projection image, $Width_{new}$ represents a scale width of the projection image, Height represents an original height of the projection image, and $Height_{new}$ represents a scale height of the projection image.

In some embodiments, scaling the projection image to the scale size includes: scaling the projection image to the scale size by using nearest neighbor interpolation, bilinear interpolation, and/or cubic convolutional interpolation.

In a second aspect, the embodiments of the present disclosure further provide a projector. The projector includes: a ranging device, a control device, a light source, a focusing device, a Digital Micromirror Device (DMD) chip, and a lens movable along an optical axis; wherein the control device is connected to the light source, the ranging device, the focusing device, and the DMD chip;

the ranging device is configured to measure a distance between the projector and a projection position;

the light source is configured to supply a projection light source;

the focusing device is configured to adjust a position of the lens;

the DMD chip is configured to display a projection image; and the control unit includes:

at least one processor, and a memory communicably connected to the at least one processor;

wherein the memory stores one or more instructions executable by the at least one processor, wherein at least one processor, when executing the one or more instructions, is caused to perform the method according to the first aspect.

In some embodiments, the ranging device is an infrared camera, a TOF sensor, and/or a structured light camera.

In a third aspect, the embodiments of the present disclosure further provide a non-volatile computer-readable storage medium storing one or more computer-executable instructions, wherein the one or more computer-executable instructions, when executed by a computer, cause the computer to perform the method according to the first aspect.

In a fourth aspect, the embodiments of the present disclosure further provide a computer program product including one or more computer programs stored in a computer-readable storage medium, wherein the one or more computer programs include one or more program instructions, which, when executed by a computer, cause the computer to perform the method according to the first aspect.

The embodiments of the present disclosure achieve the following beneficial effects: The embodiments of the present disclosure provide a zooming projection method and a projector. The method is applicable to the projector. The projector includes a focusing device and a lens movable along an optical axis. The method includes: acquiring a projection distance between the projector and a projection position; adjusting the lens to a target position for projection by the focusing device in response to the projection distance being within an optical zooming range; and scaling a projection image and projecting the scaled projection image in response to the projection distance being not within the optical zooming range. According to the embodiments of the present disclosure, the lens is moved to the target position by optical zooming, or the projection image is scaled to a target size by digital zooming. In this way, the size of a projection picture remains unchanged where the projection distance is changed.

BRIEF DESCRIPTION OF THE DRAWINGS

One or more embodiments are illustrated by way of example, and not by limitation, in the figures of the accompanying drawings, wherein elements/modules and steps having the same reference numeral designations represent like elements/modules and steps throughout. The drawings are not to scale, unless otherwise disclosed.

DETAILED DESCRIPTION

The present disclosure is further described with reference to some exemplary embodiments. The embodiments hereinafter facilitate further understanding of the present disclosure for a person skilled in the art, rather than causing any limitation to the present disclosure. It should be noted that persons of ordinary skill in the art may derive various variations and modifications without departing from the inventive concept of the present disclosure. Such variations and modifications shall pertain to the protection scope of the present disclosure.

For better understanding of the present disclosure, the present disclosure is described in detail with reference to attached drawings and specific embodiments. Unless the context clearly requires otherwise, throughout the specification and the claims, technical and scientific terms used herein denote the meaning as commonly understood by a person skilled in the art. Additionally, the terms used in the specification of the present disclosure are merely for describing the objectives of the specific embodiments, and are not intended to limit the present disclosure. As used herein, the term "and/or" in reference to a list of one or more items covers all of the following interpretations of the term: any of the items in the list, all of the items in the list and any combination of the items in the list.

It should be noted that, in the absence of conflict, embodiments of the present disclosure and features in the embodiments may be incorporated, which all fall within the protection scope of the present disclosure. In addition, although logic function module division is illustrated in the schematic diagrams of apparatuses, and logic sequences are illustrated in the flowcharts, in some occasions, steps illustrated or described by using modules different from the module division in the apparatuses or in sequences different from those illustrated. Further, the terms "first," "second," and the like used in this text do not limit data and execution sequences, and are intended to distinguish identical items or similar items having substantially the same functions and effects.

Figure 1:
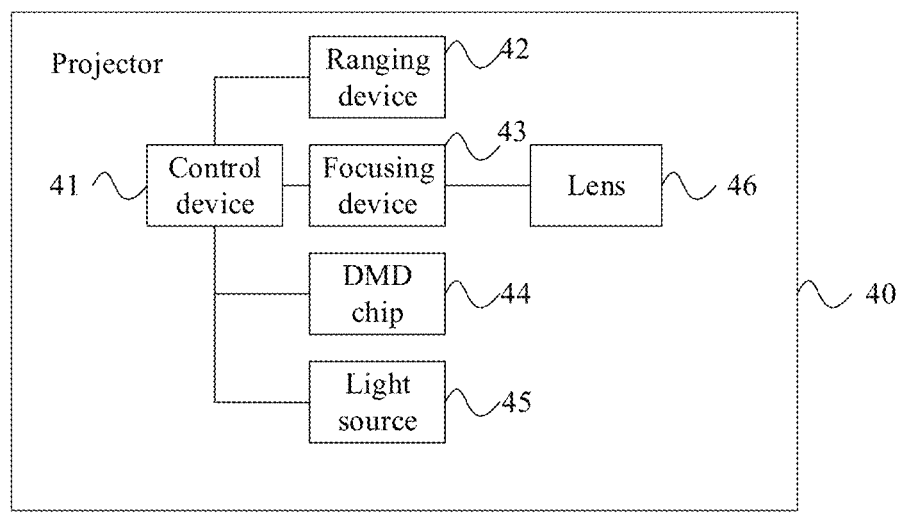
FIG. 1 is a schematic structural diagram of a projector according to an embodiment of the present disclosure.

Referring to FIG. 1, FIG. 1 is a schematic structural diagram of a projector 40 according to an embodiment of the present disclosure. As illustrated in FIG. 1, the projector 40 includes: a control device 41, a ranging device 42, a focusing device 43, a Digital Micromirror Device (DMD) chip 44, a light source 45, and a lens 46 movable along an optical axis. The control device 41 is connected to the ranging device 42, the focusing device 43, the DMD chip 44, and the light source 45.

The ranging device 42 is configured to measure a distance between the projector and a projection position. In some embodiments, the ranging device 42 may be a TOF sensor. The TOF sensor is configured to detect a projection distance. TOF is an acronym of time of flight. Modulated near-infrared light emitted from a TOF sensor is reflected by an object, and the TOF sensor calculates a time difference or a phase difference between light emission and light reflection, and converts the time difference or the phase difference into a distance of a photographed subject. By the TOF sensor, high-precision and centimeter-level distance detection is implemented, which is favorable to detection of the projection distance. In some other embodiments, the ranging device 42 may also be an infrared camera and/or a structured light camera. In practice, the ranging device 42 may also be any other suitable ranging instrument applicable to the projector, which may be designed according to the actual needs and is not limited to the description of the embodiments of the present disclosure.

The light source 45 is configured to supply a projection light source. The light source 45 may be a xenon lamp, a halogen lamp, an ultra high pressure (UHP) mercury lamp, an ultra-high efficiency (UHE) lamp or the like traditional high-pressure gas discharge light source, or may be an LED light source, a mixed light source, or a laser light source or the like new light source, and configured to emit an illumination light beam to supply an illumination light source for the projection image.

The focusing device 43 is configured to adjust a position of the lens 46, adjust a focal length of the lens, and is connected to the lens 46. In some other embodiments, the focusing device 43 may be a focusing device including a step motor. The step motor is configured to supply power for moving the lens. The control device 41 is connected to the step motor, and the step motor is movably connected to the lens 46. In the case that a target position of the lens 46 is determined based on a projection ratio or the focal length of the lens, the control device 41 makes comparison and calculation, and controls the step motor to rotate to drive the lens 46 to telescope, such that the lens 46 is moved to the target position. In practice, the focusing device 43 may also be any other suitable focusing device applicable to the projector, which may be designed according to the actual needs and is not limited to the description of the embodiments of the present disclosure.

The DMD chip 44 is configured to display the projection image. The DMD chip 44 is configured to receive an illumination light beam emitted from the illumination light source, and project and display the projection image.

Figure 2:
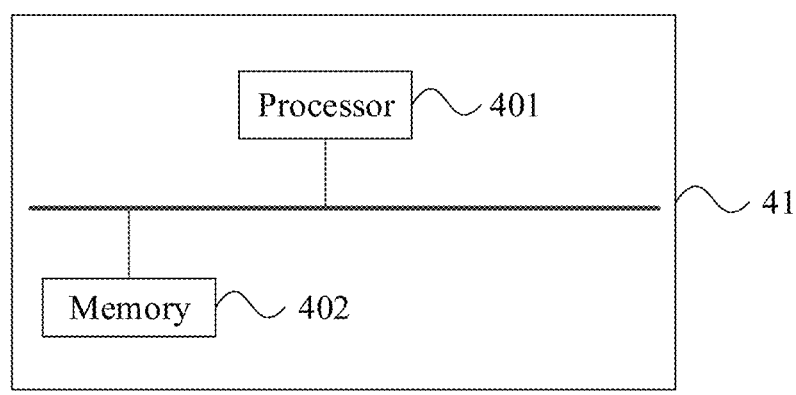
FIG. 2 is a schematic structural diagram of a control device in the projector according to an embodiment of the present disclosure.

The controller 41 includes: at least one processor 401 and a memory 402 communicably connected to the at least one processor 401. FIG. 2 uses one processor 401 as an example.

The processor 401 and the memory 402 may be connected via a bus or in another manner, and FIG. 2 uses the bus as an example.

The memory 402, as a non-volatile computer readable storage medium, may be used to store non-volatile software programs, and non-volatile computer executable programs and modules. The non-volatile software programs, instructions and modules stored in the memory 402, when executed, cause the processor 401 to perform various function applications and data processing of the control device, that is, performing the zooming projection method according to the method embodiments hereinafter.

The memory 402 may include a program memory area and data memory area, wherein the program memory area may store operation systems and application programs needed by at least function; and the data memory area may store data created according to the usage of the control device. In addition, the memory 402 may include a high-speed random access memory, or include a non-volatile memory, for example, at least one disk storage device, a flash memory device, or another non-volatile solid storage device. In some embodiments, the memory 402 optionally includes memories remotely configured relative to the processor 401. These memories may be connected to the processor over a network. Examples of the above network include, but not limited to, the Internet, Intranet, local area network, mobile communication network and a combination thereof.

Figure 3:
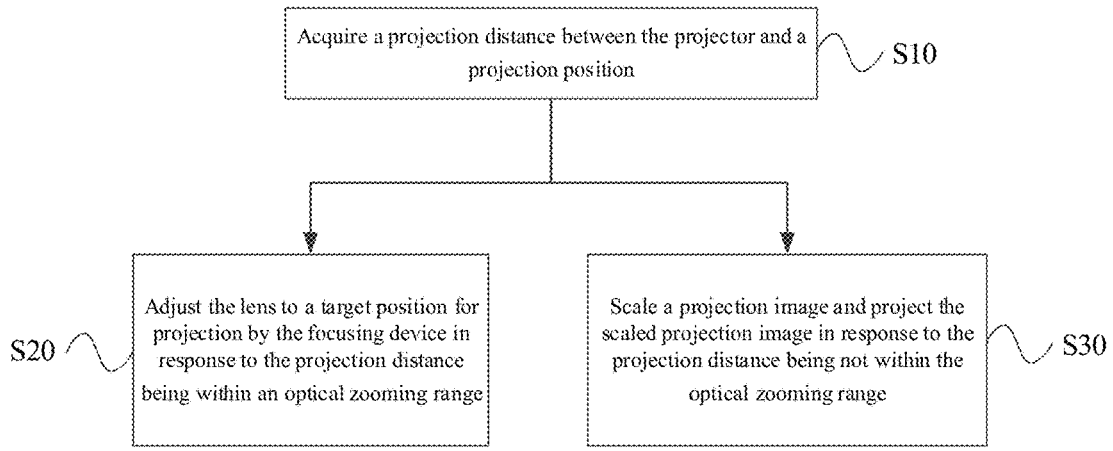
FIG. 3 is a schematic flowchart of a zooming projection method according to an embodiment of the present disclosure.

Hereinafter, a zooming projection method according to the embodiments of the present disclosure is described in detail with reference to the accompanying drawings. Referring to FIG. 3, FIG. 3 is a schematic flowchart of a zooming projection method according to an embodiment of the present disclosure. The zooming projection method may be performed by the control device as illustrated in FIG. 1. The zooming projection method includes the flowing steps.

In step S10, a projection distance between the projector and a projection position is acquired.

In the case that the projection lens of the projector and the projection position are changed, the projection distance is also changed. A distance $D_p$, that is, the projection distance $D_p$, between the projector and the projection position may be acquired by a ranging device in the projector. The projection position may be a surface of any medium that is capable of projecting images such as a projection canvas, a wall, or the like.

In step S20, the lens is adjusted to a target position for projection by the focusing device in response to the projection distance being within an optical zooming range.

Within the optical zooming range, zooming may be achieved by moving the lens, to ensure the size of the projection picture. However, the zooming range of the lens movable along the optical axis is limited, and a focal length of the lens may be adjusted between a minimum focal length and a maximum focal length. In addition, within the zooming range of the lens, the focal length of the lens is in one-to-one correspondence with the projection distance. The minimum focal length corresponds to a minimum adjustable projection distance, and the maximum focal length corresponds to a maximum adjustable projection distance. The minimum adjustable projection distance and the maximum adjustable projection distance determine the optical zooming range [D0, D1]. That is, within a projection distance range [D0, D1], the focal length of the lens may be adjusted by adjusting the position of the lens, such that the projection picture is maintained at a width W.

Specifically, within the optical zooming range, a first correspondence table may be pre-established between the projection distance and the lens position, wherein the first correspondence table is a set of corresponding lens positions under different projection distances within the optical zooming range. That is, within the projection distance range [D0, D1], the projection distance is in one-to-one correspondence with the lens position. To maintain a width W of the projection picture, in the case that the distance Dt between the projector and the projection position is within the range [D0, D1], the target position of the lens corresponding to the projection distance Dt may be found by querying the first correspondence table by optical zooming, the lens is adjusted to the target position by the focusing device and the focal length of the lens is adjusted by adjusting the position of the lens, and finally, the projection picture is projected. In this way, the projection picture is maintained at the width W.

In step S30, a projection image is scaled and the scaled projection image is projected in response to the projection distance being not within the optical zooming range.

The optical zooming range $[D_0, D_1]$ is limited, and is determined by the minimum adjustable projection distance and the maximum adjustable projection distance. In the case that the projection distance $D_t$ is not within the range $[D_0, D_1]$, the width of the projection picture may not be ensured by adjusting the position of the lens, that is, the projection picture may not be maintained at the width W by optical zooming. In this case, the size of the projection picture may be adjusted by digital zooming, the projection image is adjusted to the target size, and the projection image is scaled and then projected, such that the projection picture is maintained at the width W.

In the embodiment of the present disclosure, the projection distance between the projector and the projection position is acquired first; in the case that the projection distance is within the optical zooming range, the focusing device is moved to the target position by optical zooming, and then the projection image is projected; in the case that the projection distance is not within the optical zooming range, the projection image is scaled by digital zooming, and then the scaled projection image is projected, such that the projection picture is maintained at the width W during the process of projection.

Figure 4:
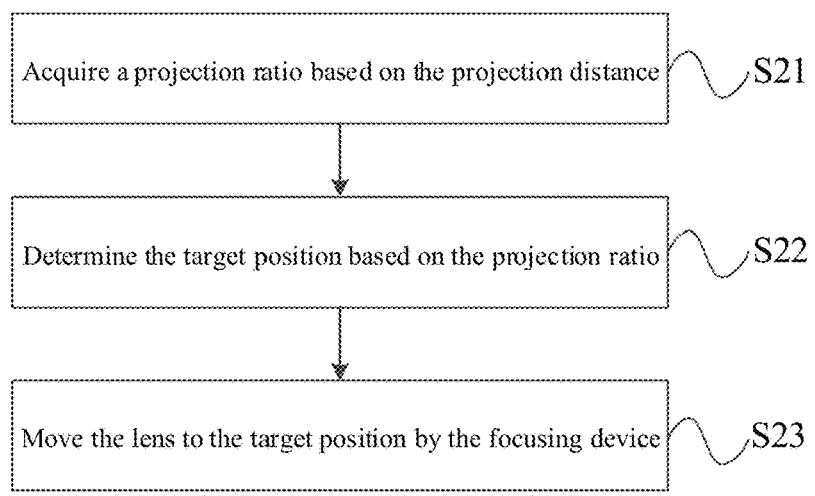
FIG. 4 is a schematic flowchart of adjusting a lens to a target position by a focusing device in the zooming projection method according to an embodiment of the present disclosure.

In some embodiments, referring to FIG. 4, step S20 further includes:

In step S21, a projection ratio is acquired based on the projection distance.

Specifically, the projection ratio is acquired by using the following formula:

$$TR_t = \frac{D_t}{W}$$

wherein $D_t$ represents the projection distance between the projector and the projection position, W represents a width of a projection picture, and $TR_t$ represents a projection ratio corresponding to the projection distance $D_t$.

In step S22, the target position is determined based on the projection ratio.

Within the optical zooming range, the projection ratio of the lens is in one-to-one correspondence with the lens position, and the target position of the lens corresponding to the projection ratio $TR_t$ is determined based on the projection ratio $TR_t$.

For example, a second correspondence table may be established between the projection ratio of the lens and the lens position within the optical zooming range. The second correspondence table is a set of corresponding lens positions under different projection ratios of the lens within the optical zooming range. That is, within the projection distance range $[D_0, D_1]$ the projection ratio of the lens is in one-to-one correspondence with the lens position. To maintain a width W of the projection picture, in the case that the distance $D_t$ between the projector and the projection position is within the range $[D_0, D_1]$, the target position of the lens may be determined by optical zooming based on the projection ratio $TR_t$ acquired in step S21 and the second correspondence table.

In step S23, the lens is moved to the target position by the focusing device.

Within the optical zooming range, in the case that the target position of the lens is found by the one-to-one correspondence between the projection ratio of the lens and the lens position, the lens is moved to the target position by the focusing device, and then the projection image is projected.

To sum up, during the zooming projection, in the case that the projection distance $D_t$ is within the range $[D_0, D_1]$, that is, the projection distance $D_t$ is within the optical zooming range, the projection ratio of the lens is calculated as $$TR_t = \frac{D_t}{W},$$

and the position of the lens corresponding to the projection ratio $TR_t$ is acquired, and then the lens is moved to the target position and then the projection image is projected. In this case, an actual width of the projection picture is:

$$W_t = \frac{D_t}{TR_t} = \frac{D_t}{\frac{D_t}{W}} = W$$

It may be seen that the actual width of the projection picture is equal to the width W that needs to be ensured.

Figure 5:
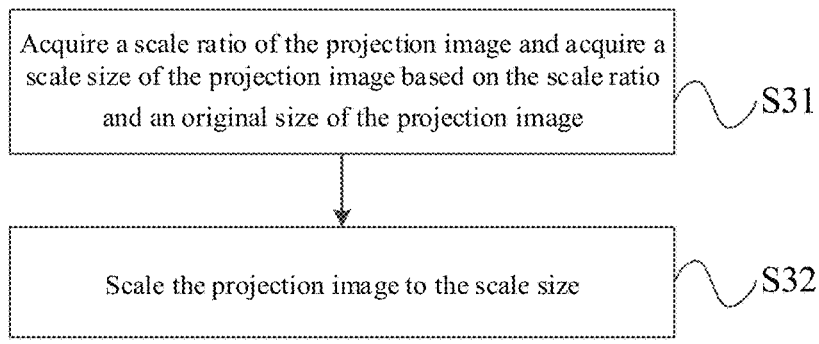
FIG. 5 is a schematic flowchart of scaling a projection image in the zooming projection method according to an embodiment of the present disclosure.

In some embodiments, referring to FIG. 5, step S30 specifically includes the following steps.

In step S31, a scale ratio of the projection image is acquired and a scale size of the projection image is acquired based on the scale ratio and an original size of the projection image.

Specifically, acquiring the scale ratio of the projection image and acquiring the scale size of the projection image based on the scale ratio and the original size of the projection image include:

acquiring the scale ratio of the projection image by using the following formula:

$$\frac{D_2}{D_t}$$

wherein the focal length of the lens is in correspondence with the projection distance within the optical zooming range, $D_2$ represents a projection distance corresponding to a current focal length of the lens within the optical zooming range, and $D_t$ represents an actual the projection distance between the projector and the projection position. Specifically, a third correspondence table may be established between the focal length of the lens and the projection distance within the optical zooming range. The third correspondence table is a set of corresponding projection distances under different focal lengths of the lens within the optical zooming range. The projection distance $D_2$ corresponding to the current focal length of the lens within the optical zooming range is determined, based on the third correspondence table established within the optical zooming range, by acquiring the current focal length of the lens.

The scale size of the projection image is acquired by using the following formula:

$$\text{Width}_{new} = \text{Width} * \frac{D_2}{D_t}$$

$$\text{Height}_{new} = \text{Height} * \frac{D_2}{D_t}$$

wherein Width represents an original width of the projection image, $\text{Width}_{new}$ represents a scale width of the projection image, Height represents an original height of the projection image, and $\text{Height}_{new}$ represents a scale height of the projection image.

In the case that the scaled projection image is projected, the actual width of the projection picture is:

$$W_t = \frac{D_t}{TR_2} \cdot \frac{\text{Width}_{new}}{\text{Width}} = \frac{D_t}{\frac{D_2}{W}} \cdot \frac{D_2}{D_t} = W$$

It may be seen that the actual width of the projection picture is equal to the width W that needs to be ensured.

In practice, the digital zooming may reduce a resolution of the image, and for improving the resolution of the image, in some other embodiments, the lens may be moved to the target position corresponding to the maximum adjustable focal length of the lens, then the projection image is scaled, and finally the projection image is projected. In this embodiment, step S31 includes:

moving the lens to the target position corresponding to the maximum adjustable focal length of the lens by the focusing device;

acquiring the scale ratio of the projection image by using the following formula:

$$\frac{D_1}{D_t}$$

wherein the focal length of the lens is in correspondence with the projection distance within the optical zooming range, and an upper limit of the optical zooming range is a maximum adjustable projection distance, wherein the maximum adjustable projection distance corresponds to a maximum adjustable focal length of the lens. $D_1$ represents the maximum adjustable projection distance, and $D_t$ represents the projection distance between the projector and the projection position; specifically, the third correspondence table may be established between the focal length of the lens and the projection distance within the optical zooming range; the maximum adjustable projection distance $D_1$ corresponding to the maximum adjustable focal length of the lens may be determined, based on the third correspondence table, and then the scale ratio is calculated, by acquiring the maximum adjustable focal length of the lens; and acquiring the scale size of the projection image by using the following formula:

$$\text{Width}_{new} = \text{Width} * \frac{D_1}{D_t}$$

$$\text{Height}_{new} = \text{Height} * \frac{D_1}{D_t}$$

wherein Width represents an original width of the projection image, $\text{Width}_{new}$ represents a scale width of the projection image, Height represents an original height of the projection image, and $\text{Height}_{new}$ represents a scale height of the projection image.

In the case that the scaled projection image is projected, the actual width of the projection picture is:

$$W_t = \frac{D_t}{TR_2} \cdot \frac{\text{Width}_{new}}{\text{Width}} = \frac{D_t}{\frac{D_1}{W}} \cdot \frac{D_1}{D_t} = W$$

It may be seen that the actual width of the projection picture is equal to the width W that needs to be ensured.

Accordingly, in the case that the projection distance $D_t$ is not within the range $[D_0, D_1]$, the lens is moved to the target position corresponding to the maximum focal length, and thus the resolution of the image is improved. Subsequently, the projection image is scaled to a corresponding size, and finally the projection image is projected, or the position of the lens is not moved, the projection image is directly scaled to the corresponding size, and finally the projection image is projected, such that the projection picture is maintained at the width W.

In step S32, the projection image is scaled to the scale size.

Specifically, a value is assigned to each pixel of the projection image by using nearest neighbor interpolation, bilinear interpolation, and/or cubic convolutional interpolation, such that the projection image is scaled to the scale size. For example, in the case that the nearest neighbor interpolation algorithm is used, in the process of scaling the projection image to the target size, interpolation estimation is performed on each new pixel of the projection image, and pixel values of the transformed projection image are set as gray scale values of the pixels nearest to pixel points in an original projection image, such that a new projection image is acquired, and then projection image is projected.

Generally, a user has a desired size of the projection picture, that is, the width W of the projection picture desired by the user. For example, prior to step S10, the width W of the projection picture may be acquired first, so as to subsequently adjust the focal length of the lens or the size of the projection image based on the width W of the projection picture and the acquired projection distance, such that the user may acquire the projection picture which is coincident or approximately coincident with the desired size of the projection picture.

Specifically, the projector may first predefine an original value W of the width of the projection picture. In practice, the user may define a desired width value of the projection picture according to the actual needs so as to subsequently adjust the focal length of the lens, thereby ensuring that the projection picture has the actual width value desired by the user. A plurality of ways are available for acquiring the desired width of the projection picture, which are not limited herein. For example, the width sizes of a plurality of projection pictures may be predefined, and the user may select a width of the projection picture from the widths of the plurality of projection pictures as the desired size of the projection picture, or the user may directly define the width of the projection picture. In the case that the width of the projection picture is determined, and the projection distance is adjusted, by using the subsequent zooming projection method, the width of the projection picture is ensured to be the size desired by the user.

An embodiment of the present disclosure further provides a non-volatile computer-readable storage medium. The non-volatile computer-readable storage medium stores one or more computer-executable instructions, which, when executed by one or more processors, for example, the processor 401 as illustrated in FIG. 2, cause the one or more processors to perform the zooming projection method according to any of the above method embodiments, for example, performing the steps as illustrated in FIG. 3 to FIG. 5, and implementing the functions of the devices as illustrated in FIG. 1.

An embodiment of the present disclosure further provides a computer program product. The computer program product includes one or more computer programs stored in a non-volatile computer-readable storage medium. The one or more computer programs include one or more program instructions, which, when executed by a computer, cause the computer to perform the zooming projection method in any of the above method embodiments, for example, performing the steps in the methods as illustrated in FIG. 3 to FIG. 5, and implementing the functions of the devices as illustrated in FIG. 1.

The embodiments of the present disclosure provide a zooming projection method and a projector. The zooming projection method is, applicable to a the projector. The projector includes a focusing device and a lens movable along an optical axis. The method includes: acquiring a projection distance between the projector and a projection position; adjusting the lens to a target position for projection by the focusing device in response to the projection distance being within an optical zooming range; and scaling an a projection image and projecting the scaled projection image in response to the projection distance being not within the optical zooming range. According to the embodiments of the present disclosure, the lens is moved to the target position by optical zooming, or the projection image is scaled to a target size by digital zooming. In this way, the size of a projection picture remains unchanged where the projection distance is changed.

According to the above embodiments of the present disclosure, a person skilled in the art may clearly understand that the embodiments of the present disclosure may be implemented by means of hardware or by means of software plus a necessary general hardware platform. Based on such understanding, portions of the technical solutions of the present disclosure that essentially contribute to the related art may be embodied in the form of a software product, the computer software product may be stored in a computer-readable storage medium, such as a read-only memory (ROM)/random-access memory (RAM), a magnetic disk, or a compact disc read-only memory (CD-ROM), including several instructions for causing a computer device (a personal computer, a server, or a network device) to perform the method in various embodiments of the present disclosure or some of the embodiments.

It should be noted that the above described device embodiments are merely for illustration purpose only. The units which are described as separate components may be physically separated or may be not physically separated, and the components which are illustrated as units may be or may not be physical units, that is, the components may be located in the same position or may be distributed into a plurality of network units. Part or all of the modules may be selected according to the actual needs to achieve the objects of the technical solutions of the embodiments.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

What is claimed is:

1. A zooming projection method, applicable to a projector, the projector comprising a focusing device and a lens movable along an optical axis; wherein the method comprises:
　　acquiring a projection distance between the projector and a projection position;
　　adjusting the lens to a target position for projection by the focusing device in response to the projection distance being within an optical zooming range; and
　　scaling a projection image and projecting the scaled projection image in response to the projection distance being not within the optical zooming range;
　　wherein adjusting the lens to the target position by the focusing device comprises:
　　acquiring a projection ratio based on the projection distance;
　　determining the target position based on the projection ratio; and
　　moving the lens to the target position by the focusing device.

2. The zooming projection method according to claim 1, wherein acquiring the projection ratio based on the projection distance comprises: acquiring the projection ratio by using the following formula: $TR_t = D_t/W$ wherein $D_t$ represents the projection distance, W represents a width of a projection picture, and $TR_t$ represents a projection ratio corresponding to the projection distance $D_t$.

3. The zooming projection method according to claim 1, wherein scaling the projection image comprises:
　　acquiring a scale ratio of the projection image and acquiring a scale size of the projection image based on the scale ratio and an original size of the projection image; and
　　scaling the projection image to the scale size.

4. The zooming projection method according to claim 3, wherein an upper limit of the optical zooming range is a maximum adjustable projection distance, wherein the maximum adjustable projection distance corresponds to a maximum adjustable focal length of the lens; and acquiring the scale ratio of the projection image and acquiring the scale size of the projection image based on the scale ratio and the original size of the projection image comprise:

moving the lens to the target position corresponding to the maximum adjustable focal length by the focusing device;

acquiring the scale ratio of the projection image by using the following formula:

$$\frac{D_1}{D_t}$$

wherein $D_1$ represents the maximum adjustable projection distance, and $D_t$ represents the projection distance; and acquiring the scale size of the projection image by using the following formula:

$$\text{Width}_{new} = \text{Width} * \frac{D_1}{D_t}$$

$$\text{Height}_{new} = \text{Height} * \frac{D_1}{D_t}$$

wherein Width represents an original width of the projection image, $\text{Width}_{new}$ represents a scale width of the projection image, Height represents an original height of the projection image, and $\text{Height}_{new}$ represents a scale height of the projection image.

5. The zooming projection method according to claim 3, wherein a focal length of the lens is in correspondence with the projection distance within the optical zooming range, and acquiring the scale ratio of the projection image and acquiring the scale size of the projection image based on the scale ratio and the original size of the projection image comprise:

acquiring the scale ratio of the projection image by using the following formula:

$$\frac{D_2}{D_t}$$

wherein D2 represents a projection distance corresponding to a current focal length of the lens within the optical zooming range, and $D_t$ represents the projection distance; and acquiring the scale size of the projection image by using the following formula:

$$\text{Width}_{new} = \text{Width} * \frac{D_2}{D_t}$$

$$\text{Height}_{new} = \text{Height} * \frac{D_2}{D_t}$$

wherein Width represents an original width of the projection image, $\text{Width}_{new}$ represents a scale width of the projection image, Height represents an original height of the projection image, and $\text{Height}_{new}$ represents a scale height of the projection image.

6. The zooming projection method according to claim 4, wherein scaling the projection image to the scale size comprises:

scaling the projection image to the scale size by using nearest neighbor interpolation, bilinear interpolation, and/or cubic convolutional interpolation.

7. A projector, comprising: a ranging device, a control device, a light source, a focusing device, a Digital Micromirror Device (DMD) chip, and a lens movable along an optical axis; wherein the control device is connected to the light source, the ranging device, the focusing device, and the DMD chip;

the ranging device is configured to measure a projection distance between the projector and a projection position;

the light source is configured to supply a projection light source;

the focusing device is configured to adjust a position of the lens;

the DMD chip is configured to display a projection image; and the control device comprises:

at least one processor, and a memory communicably connected to the at least one processor;

wherein the memory stores one or more instructions executable by the at least one processor, wherein the at least one processor, when executing the one or more instructions, is caused to perform the zooming projection method as defined in claim 1.

8. The projector according to claim 7, wherein the ranging device is an infrared camera, a TOF sensor, and/or a structured light camera.

9. A non-volatile computer-readable storage medium storing one or more computer-executable instructions, wherein the one or more computer-executable instructions, when executed by a computer, cause the computer to perform the zooming projection method as defined in claim 1.

10. A computer program product, comprising one or more computer programs stored in a non-volatile computer readable storage medium, wherein the one or more computer programs comprises one or more program instructions, wherein the one or more instructions, when executed by a computer, cause the computer to perform the zooming projection method as defined in claim 1.

\* \* \* \* \*